Patented Aug. 17, 1943

2,326,868

UNITED STATES PATENT OFFICE 2,326,868

METHOD FOR DEHUSKING CAROB BEANS

Louis Amédée Lantz and Wadim Roman, Manchester, England, assignors to The Calico Printers' Association Limited, Manchester, England, a British company No Drawing. Application February 20, 1942, Serial No. 431,770. In Great Britain February 27, 1941

7 Claims. (Cl. 83—28)

The seeds of the carob tree (*Ceratonia siliqua* L.) commonly known as carob or locust beans or kernels, are used industrially for the production of a gum, which, in the form of aqueous mucilage is utilised to some extent in the food industry, but mainly in the textile industry for sizing and finishing textile products, and as a thickener in the printing of textile fabrics.

The carob bean consists of a dark-coloured tegument or husk, an embryo with two large flat cotyledons, and between tegument and cotyledon, two symmetrical, more or less transparent hard lenticular bodies, the endosperm. The endosperm is the portion of the bean yielding the gum which has been mentioned above as being suitable for use in the food and textile industries. The other constituents of the bean do not take part in the formation of the mucilage and it has therefore been considered necessary to remove them from the endosperm as thoroughly as possible.

The removal of the embryo, together with its cotyledons, is comparatively easy to effect, because on grinding the dry beans, it is reduced to a fine powder; while the much harder endosperm only breaks up into comparatively large particles. A fairly good separation can therefore be obtained by sieving after grinding.

The husk, although it is more friable than the endosperm, is much more difficult to remove because it adheres tenaciously to the latter. The ground gum is therefore contaminated with dark brown particles of husk, which not only detract from the appearance of the gum, but are also apt to cause difficulties in its use, especially when it is used as a thickener in textile printing.

Attempts have therefore been made to remove the husks before grinding the beans. Thus, it has been proposed to steep the beans in alkaline solutions, in order to soften the husk and cause it to detach itself from the gum, but this process has not proved advantageous in practice, because the gum also tends to swell and gelatinise due to the action of the alkali, and the removal of the softened husk still remains a difficult operation under bulk conditions.

It has also been proposed to treat the beans with sulphuric acid at ordinary temperature for 5 to 10 hours. This process has, however, been found unreliable, as depending on the conditions used, either the husk is insufficiently attacked by the acid to be removed easily, or, if the conditions are such as to destroy the husk, it is found that the gum has also suffered considerable attack.

The object of the present invention is to provide a method of treating carob beans which is free from these drawbacks, and with this object in view, the invention consists in treating carob beans with concentrated sulphuric or phosphoric acid containing less than 10%, and preferably not more than 5% of water, so as to prevent any appreciable swelling of the gum, the temperature of treatment being not less than 40° C. and being prevented from rising to a point at which attack on the gum occurs. By this treatment the husk can be destroyed and made completely removable without materially affecting the gum.

Our invention further comprises treating carob beans in the air-dry condition with sulphuric acid of more than 90%, and preferably of not less than 95% concentration, at a temperature between 40° and 70° C. and for such a time that the husk is carbonised without the gum being materially attacked.

Our invention further comprises treating carob beans with sulphuric acid of over 90% and preferably not less than 95% concentration, at a temperature between 40° and 70° C., for a duration of 2 to 10 hours, washing the carbonised husk away with a stream of cold water, fully rinsing the de-husked beans with cold water to remove traces of acid and finally drying them.

The time of treatment in acid is dependent to a certain extent on the temperature, and a temperature of 40–50° C. has been found most advantageous. Under 40° C. the process becomes rather too slow for practical use, and if the temperature is allowed to rise beyond 70° C., attack of the gum will take place and poor yields are obtained. The process may be started in the cold, or the acid may be warmed to about 40° C. in order to start the reaction. This takes place with a considerable evolution of heat, and cooling is therefore necessary at a fairly early stage.

Our invention further comprises treating carob beans with phosphoric acid of a concentration of 94% and above, and at a temperature between 60° and 90° C.

The amount of sulphuric or phosphoric acid added to the carob beans must be at least 80% of the weight of the latter.

The husk-free beans are mechanically treated in known manner so as to separate the bulk of the gum in the form of coarse particles from the finely ground embryo. The coarse gum particles are then subjected to fine grinding and dressing, and yield a pure white flour eminently suitable for the food industry.

The by-products, which contain the embryo together with some of the gum, can be used after fine grinding as a sizing material for textiles, or as a thickening for textile printing. The by-product has been found particularly advantageous for this latter purpose, inasmuch as it yields a thickening which is stable against alkaline substances, while a thickening made from carob beans which have not been treated according to our invention coagulates readily on addition of alkalies. The by-product can also be treated with a solvent to extract the oil it contains, and it can further serve as a source of vegetable protein.

Example I 10 parts by weight of carob beans are mixed with 9 parts by weight of sulphuric acid (95%) in a jacketed tank, and the mass is stirred for 40-50 minutes, cooling being applied as soon as necessary to prevent the temperature rising above 50° C. After this time, the mass has become thick, and is left for another two hours, or more without further stirring. Samples are taken at intervals, and as soon as the carbonised husks have become easily removable by washing, a volume of cold water about equal to the volume of acid previously used is added, stirring is resumed, and the diluted acid is drained off. The beans are then fully rinsed with cold water, and dried in warm air.

Example II 10 parts by weight of carob beans are mixed in a jacketed tank with 10 parts by weight of phosphoric acid (98% concentration), pre-heated to about 60° C. The mass is stirred for about 50 minutes when cooling may become necessary to prevent the temperature rising above 70° C. Stirring is continued at that temperature for a further 3 hours. After this time the mass has become thick, and is left for another seven hours or more without further stirring. Samples are taken at intervals, and as soon as the carbonised husks have become easily removable by washing, they are washed off in the same way as described above in Example I.

What we claim is:

1. A method of dehusking carob beans which comprises treating 10 parts by weight of beans with at least 8 parts by weight of sulphuric acid of 95% concentration, stirring the mass for 40-50 minutes, cooling it to maintain its temperature at about 50° C., allowing the mass which has thickened to stand for two hours or more, removing the carbonised husks by washing with a volume of water about equal to the volume of acid added and stirring, draining off the diluted acid, fully rinse with cold water and dry in warm air.

2. A method of dehusking carob beans comprising treating them with phosphoric acid of a concentration of at least 94%, and at a temperature between 60° and 90° C. until the husk is carbonised but before any appreciable attack on the gum in the beans occurs.

3. A method of dehusking carob beans comprising treating them with phosphoric acid of at least 94% concentration preheated to 60° C., the mass being stirred for about 50 minutes and its temperature prevented from rising above 70° C., stirring being continued at 70° C. for a further three hours, the mass being then allowed to stand without stirring for another seven hours or more, after which the carbonised husks are washed off and the dehusked beans fully rinsed and then dried.

4. A method of dehusking carob beans, which comprises treating the beans with a concentrated acid selected from the group consisting of sulphuric acid and phosphoric acid, and containing less than 10% of water, at a temperature not less than 40° C., but not so high that attack on the gum occurs, and continuing the treatment until the husks have become carbonised.

5. A method of dehusking carob beans, which comprises mixing the beans with at least 80% of their weight of a concentrated acid selected from the group consisting of sulphuric acid and phosphoric acid, and containing less than 10% of water, maintaining a temperature not less than 40° C., but below the temperature at which attack on the gum occurs, and continuing the treatment until the husks have become carbonised.

6. A method of dehusking carob beans, which comprises treating the beans with sulphuric acid of more than 90% concentration at a temperature between 40° and 70° C., and continuing the treatment until the husks have become carbonised without the gum being materially attacked.

7. A method of dehusking carob beans which comprises treating the beans with sulphuric acid of over 90% concentration, at a temperature between 40° and 70° C., for a duration of 2 to 10 hours, washing the carbonised husk away with a stream of cold water, fully rinsing the dehusked beans with cold water to remove traces of acid, and finally drying them.

LOUIS AMÉDÉE LANTZ.
WADIM ROMAN.